United States Patent
Zhang et al.

(10) Patent No.: US 8,558,107 B2
(45) Date of Patent: Oct. 15, 2013

(54) DYE-SENSITIZED SOLAR CELL EMPLOYING ZINC OXIDE AGGREGATES GROWN IN THE PRESENCE OF LITHIUM

(75) Inventors: Qifeng Zhang, Seattle, WA (US); Guozhong Cao, Seattle, WA (US)

(73) Assignee: University of Washington, Seattle, WA (US)

(*) Notice: Subject to any disclaimer, the term of this patent is extended or adjusted under 35 U.S.C. 154(b) by 128 days.

(21) Appl. No.: 13/021,520

(22) Filed: Feb. 4, 2011

(65) Prior Publication Data

US 2011/0162708 A1    Jul. 7, 2011

Related U.S. Application Data

(63) Continuation of application No. PCT/US2009/052531, filed on Aug. 3, 2009.

(60) Provisional application No. 61/085,971, filed on Aug. 4, 2008, provisional application No. 61/230,141, filed on Jul. 31, 2009.

(51) Int. Cl.
   *H01L 31/0224*     (2006.01)
   *H01L 51/46*       (2006.01)
   *H01L 31/18*       (2006.01)

(52) U.S. Cl.
   USPC ............ 136/256; 136/252; 136/263; 438/85; 438/57; 257/E31.001

(58) Field of Classification Search
   USPC ................ 136/256, 252, 263; 438/85, 57; 257/E31.001
   See application file for complete search history.

(56) References Cited

U.S. PATENT DOCUMENTS

| 6,538,194 B1* | 3/2003 | Koyanagi et al. ............. 136/256 |
| 2002/0040728 A1* | 4/2002 | Yoshikawa ................... 136/263 |
| 2005/0150545 A1 | 7/2005 | Choi |

FOREIGN PATENT DOCUMENTS

| JP | 2008-153105 A | 7/2008 |
| JP | 2008-176948 A | 7/2008 |

(Continued)

OTHER PUBLICATIONS

Glaria et al., "Lithium ion as growth-controlling agent of ZnO nanoparticles prepared by organometallic synthesis", New J. Chem., 2008, 32, 662-669 (available online since Oct. 12, 2077 and accessed from http://pubs.rsc.org/en/content/articlepdf/2008/nj/b715583b).*

(Continued)

*Primary Examiner* — Golam Mowla
(74) *Attorney, Agent, or Firm* — Christensen O'Connor Johnson Kindness PLLC (57) ABSTRACT

Provided are a novel ZnO dye-sensitized solar cell and method of fabricating the same. In one embodiment, deliberately added lithium ions are used to mediate the growth of ZnO aggregates. The use of lithium provides ZnO aggregates that have advantageous microstructure, morphology, crystallinity, and operational characteristics. Employing lithium during aggregate synthesis results in a polydisperse collection of ZnO aggregates favorable for porosity and light scattering. The resulting nanocrystallites forming the aggregates have improved crystallinity and more favorable facets for dye molecule absorption. The lithium synthesis improves the surface stability of ZnO in acidic dyes. The procedures developed and disclosed herein also help ensure the formation of an aggregate film that has a high homogeneity of thickness, a high packing density, a high specific surface area, and good electrical contact between the film and the fluorine-doped tin oxide electrode and among the aggregate particles.

11 Claims, 8 Drawing Sheets

(56) References Cited

FOREIGN PATENT DOCUMENTS

| KR | 10-2008-0029231 A | 4/2008 |
|----|-------------------|--------|
| KR | 10-2008-0045025 A | 5/2008 |

OTHER PUBLICATIONS

Chou, T.P., et al., "Effects of Dye Loading Conditions on the Energy Conversion Efficiency of ZnO and TiO2 Dye-Sensitized Solar Cells," Journal of Physical Chemistry C 111(50):18804-18811, Dec. 2007.

Grätzel, M., "Solar Energy Conversion by Dye-Sensitized Photovoltaic Cells," Inorganic Chemistry 44(20):6841-6851, Oct. 2005.

International Preliminary Report on Patentability mailed Feb. 8, 2011, issued in corresponding International Application No. PCT/US2009/052531, filed Aug. 3, 2009, 4 pages.

Kroon, J.M., et al., "Nanocrystalline Dye-Sensitized Solar Cells Having Maximum Performance," Progress in Photovoltaics: Research and Applications 15(1):1-18, Jan. 2007.

\* cited by examiner

DYE-SENSITIZED SOLAR CELL EMPLOYING ZINC OXIDE AGGREGATES GROWN IN THE PRESENCE OF LITHIUM

CROSS-REFERENCE TO RELATED APPLICATIONS

This application is a continuation of International Application No. PCT/US20009/052531, filed Aug. 3, 2009, which claims priority to and the benefit of U.S. Provisional Patent Application No. 61/085,971, filed Aug. 4, 2008, and priority to and the benefit of U.S. Provisional Patent Application No. 61/230,141, filed Jul. 31, 2009, each of which is incorporated herein by reference in its entirety.

STATEMENT OF GOVERNMENT LICENSE RIGHTS

This invention was made with government support under grant number DE-FG02-07ER46467 awarded by U.S. Department of Energy. The government has certain rights in the invention.

BACKGROUND

The invention relates to solar cells in general and particularly to a dye-sensitized solar cell that employs zinc oxide aggregates grown in the presence of deliberately added lithium ions.

The worldwide demand for energy has increased, and the consumption of oil reserves raises the possibility that certain forms of fossil energy may have reached their peak in production. This has spurred the development of new energy sources that are cost-effective and environmentally-friendly. Solar radiation is one source of energy that potentially has no negative environmental impact. The conversion of solar radiation to electricity is accomplished using solar cells. These devices generate electrical carriers through the photovoltaic effect and then separate the photogenerated carriers to provide current at an operating voltage or electrical potential. For several decades, crystalline silicon and compound semiconductor thin films have been developed for solar cell use. However, they possess the disadvantage of high production costs. Interest has developed in dye-sensitized solar cells (DSSCs) as a consequence of their low cost and relatively high conversion efficiencies.

Many wide band gap oxides such as $TiO_2$, $SnO_2$ and $Nb_2O_5$, have been investigated as photoelectrode materials in DSSCs. Nanostructures such as nanoparticles, nanowires/nanorods, and nanotubes offer a large surface area for dye adsorption and/or a direct pathway for electron transport. As reported by J. M. Kroon, et al., in "Nanocrystalline Dye-Sensitized Solar Cells Having Maximum Performance," *Progress in Photovoltaics* 15(1):1-18, 2007; and M. Gratzel in "Solar Energy Conversion by Dye-Sensitized Photovoltaic Cells," *Inorganic Chemistry* 44(20):6841-6851, 2005, to date a maximum solar-to-electricity conversion efficiency of about 11% has been obtained with $TiO_2$ nanocrystalline films In addition to having the desired photoelectrode film structure, the achievement of good conversion efficiencies for DSSCs is also attributed to the use of ruthenium-based dyes as the photo-sensitizer. These dyes, known as N3, N719, or black dye, are efficient in capturing photons with wavelengths in the visible region. More importantly, the photogenerated electrons in these dyes have long excited-state lifetimes (~100 fs) and, therefore, can be effectively injected from the dye molecules into the semiconductor before radiative or non-radiative recombination occurs (~15 ns).

Zinc oxide (ZnO) also has been regarded as a candidate in DSSCs. The use of ZnO is thought to be advantageous at least in that 1) it can easily be fabricated into various nanostructures, and 2) it possesses a high electron mobility. However, the reported conversion efficiencies are still relatively low. Conversion efficiencies of 1.5~5% for ZnO nanocrystalline films, 0.3~4.7% for ZnO nanowires, 1.6~2.3% for ZnO nanotubes, and 0.23~5.08% for ZnO nanoporous films have previously been attained.

One issue that is a concern in ZnO-based DSSCs is the inability to obtain sufficient specific surface area for ZnO films. In addition, the poor photovoltaic performance of ZnO-based DSSCs may be caused by the instability of ZnO in ruthenium-based dye solutions. The immersion of ZnO in ruthenium-based dyes results in the formation of an inactive $Zn^{2+}$/dye complex layer on the ZnO surface. This layer serves to lower the injection efficiency of electrons from the dye molecules into the ZnO semiconductor.

There is a need for a ZnO DSSC that addresses the deficiencies of the prior art yielding a solar cell with higher conversion efficiencies.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the invention relates to a dye-sensitized solar cell. The dye-sensitized solar cell comprises a cathode having a conductive surface; an anode having a film of zinc oxide aggregate particles, the zinc oxide aggregate particles having been synthesized in the presence of deliberately added lithium ions and being composed of constituent particles, the zinc oxide aggregate particles further having been sensitized in a dye, the dye capable of absorbing photons and transferring photoexcited electrical charge to the zinc oxide aggregate particles; and an electrolyte disposed between the cathode and the anode, the electrolyte providing an electrical pathway between the cathode and the anode.

In one embodiment of the dye-sensitized solar cell, the zinc oxide aggregate particles have a plurality of sizes. In another embodiment of the dye-sensitized solar cell, a crystallinity of the zinc oxide aggregate particles is improved relative to zinc oxide aggregate particles synthesized in the absence of deliberately added lithium ions. In an additional embodiment of the dye-sensitized solar cell, a porosity of the zinc oxide aggregate particles is improved relative to zinc oxide aggregate particles synthesized in the absence of deliberately added lithium ions. In a further embodiment of the dye-sensitized solar cell, absorption of the dye by the zinc oxide aggregate particles is improved relative to zinc oxide aggregate particles synthesized in the absence of deliberately added lithium ions. In yet another embodiment of the dye-sensitized solar cell, formation of a complex between the dye and zinc ions in the zinc oxide aggregate particles is suppressed relative to zinc oxide aggregate particles synthesized in the absence of deliberately added lithium ions. In yet an additional embodiment of the dye-sensitized solar cell, a light harvesting efficiency of the dye-sensitized solar cell is improved relative to zinc oxide aggregate particles synthesized in the absence of deliberately added lithium ions. In yet a further embodiment of the dye-sensitized solar cell, electrical conduction in the zinc oxide aggregate particles is improved relative to zinc oxide aggregate particles synthesized in the absence of deliberately added lithium ions.

In another aspect, the invention features a method of fabricating a dye-sensitized solar cell. The method comprises the steps of synthesizing zinc oxide aggregate particles in the presence of deliberately added lithium ions, the zinc oxide aggregate particles being composed of constituent particles; adding a photosensitive dye to the zinc oxide aggregate particles, the dye capable of absorbing photons and transferring photoexcited electrical charge to the zinc oxide aggregate particles; preparing an anode including a photoelectrode film that includes the zinc oxide aggregate particles placed on a conductive substrate; preparing a cathode including a conductive surface; and placing an electrolyte between the anode and the cathode, the electrolyte providing an electrical pathway between the cathode and the anode.

In one embodiment of the method of fabricating a dye-sensitized solar cell, the synthesizing step includes the steps of forming a solution of a soluble zinc salt and a lithium salt in a solvent; heating the solution to a specified temperature at a specified rate; maintaining the specified temperature for a specified time to allow a chemical reaction to occur; and extracting the zinc oxide aggregates from the solution. In one embodiment of the method of fabricating a dye-sensitized solar cell, the soluble zinc salt is zinc acetate. In another embodiment of the method of fabricating a dye-sensitized solar cell, the solvent is diethylene glycol. In an additional embodiment of the method of fabricating a dye-sensitized solar cell, the specified time is at least 2 hours. In another embodiment of the method of fabricating a dye-sensitized solar cell, the specified rate is in the range of 3 to 5° C./min. In yet another embodiment of the method of fabricating a dye-sensitized solar cell, preparing the anode including the photoelectrode film includes forming a specified thickness of the zinc oxide aggregates on the conductive substrate and annealing the film for a specified time at a specified temperature. In a further embodiment of the method of fabricating a dye-sensitized solar cell, the specified temperature is in the range of 320 to 380° C.

The foregoing and other objects, aspects, features, and advantages of the invention will become more apparent from the following description and from the claims.

DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

A DSSC is a photoelectrochemical system capable of converting solar energy into electricity. DSSCs incorporate a porous-structured oxide film with absorbed dye molecules as the photosensitized anode. The counter electrode cathode comprises a conductive layer such as fluorine-doped tin oxide (FTO) glass and the like. A liquid electrolyte that traditionally contains redox couples such as $I^-/I_3^-$ and the like is used to electrically couple the anode and the cathode.

Figure 1:
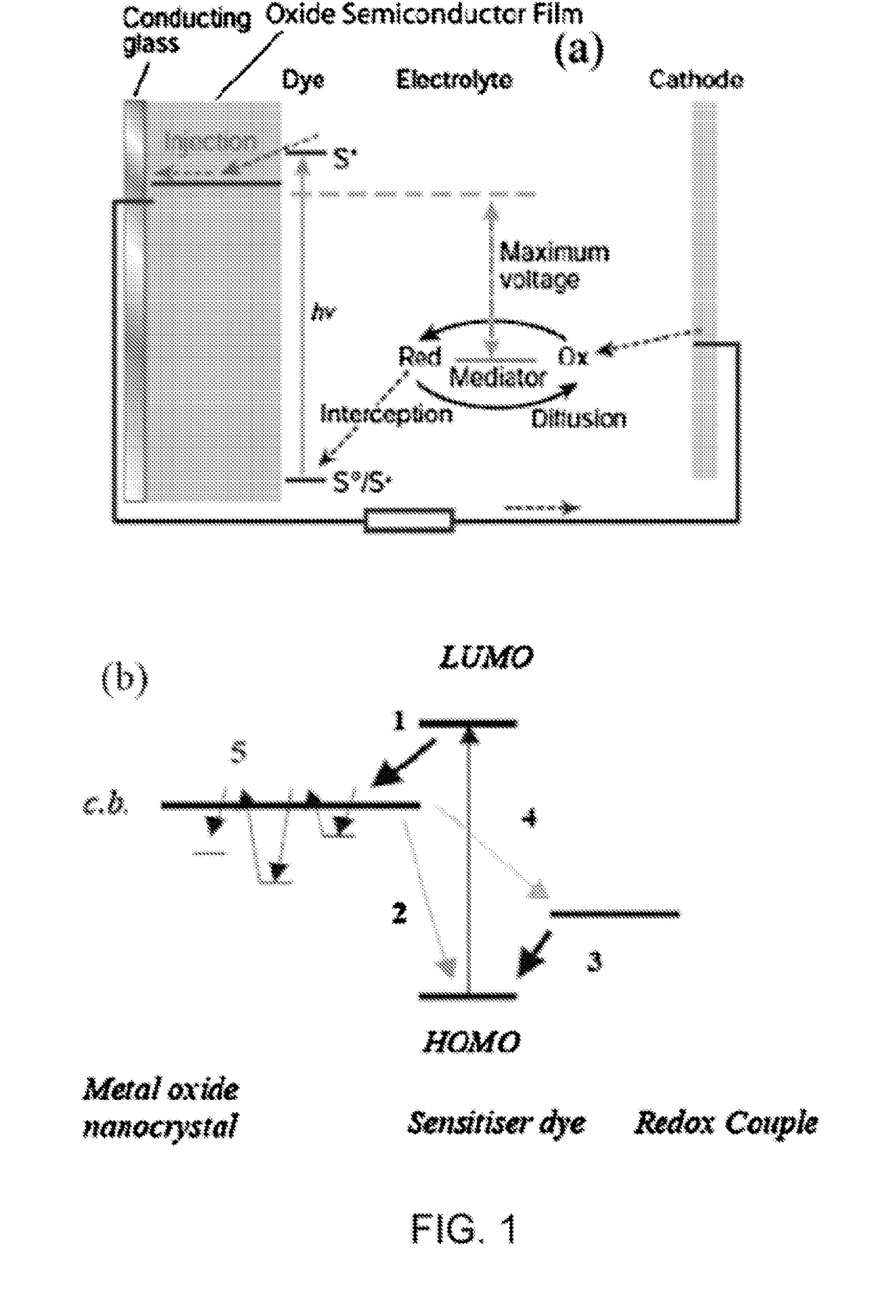
FIG. 1(a) is a schematic diagram of the construction and operational principles of a dye-sensitized solar cell based on an electrochemical system.
FIG. 1(b) is a schematic diagram illustrating electron transport in nanocrystalline oxide electrodes, in which photoexcited electrons are injected from the dye to the conduction band (denoted as "c.b.") of a nanocrystallite.

FIGS. 1(a) and 1(b) are schematic diagrams illustrating the structure and operational principles of a generic DSSC. Under illumination, photons captured by a dye-sensitizing layer (S) on the oxide film create excitons that are rapidly split at the film's nanocrystal surface. The photoexcited electrons are injected from the dye into the conduction band (denoted as "c.b.") of the nanocrystallite (1), the dye is regenerated by electron transfer from the redox couple in the electrolyte (3), and a recombination may take place between the injected electrons and the dye cation (2) or redox couple (4). The recombination of the redox couple (4) is considered to be a primary loss mechanism. Electron trapping in the nanocrystallites (5) is also a mechanism that causes energy loss. The acronyms LUMO and HOMO represent the lowest unoccupied molecular orbital and the highest occupied molecular orbital of the dye, respectively.

Lithium Zinc Oxide DSSC Overview

We describe a novel ZnO DSSC device and method of fabricating the same. In one embodiment, lithium ions are used to mediate the growth of ZnO aggregates. These aggregates are themselves composed of smaller constituent nanocrystallites. The use of lithium during synthesis results in ZnO aggregates that have advantageous microstructure, morphology, crystallinity, and operational characteristics. When used in a DSSC, these ZnO aggregates are capable of yielding devices having conversion efficiencies as high as 6.1%. With further optimization, these conversion efficiencies are expected to increase.

One result of employing lithium during aggregate synthesis is that it results in a polydisperse collection of ZnO aggregates. A polydisperse collection is one in which there are a range of aggregate sizes, whereas a monodisperse collection is one in which the aggregate sizes are well described by a single size. As the aggregate diameters are on the order of the wavelength of light, the disordered structure caused by the range of sizes in a polydisperse collection increases light scattering within the photoelectrode film. This is beneficial to the efficiency of light harvesting within the film. Another benefit of synthesizing the ZnO aggregates in the presence of lithium is that the resulting nanocrystallites forming the aggregates have improved crystallinity and more favorable facets for dye molecule absorption. In addition, the lithium synthesis improves the surface stability of ZnO in acidic dyes, which is believed to enable monolayer absorption of the dye molecules on the ZnO nanocrystallites. This monolayer absorption is thought to favor electron injection at the dye-semiconductor interface, thereby reducing energy loss in dye-sensitized solar cells. A further benefit of the lithium-mediated growth is that it improves the porosity of the ZnO aggregates. This is important to both dye absorption and electrolyte infusion.

In addition to the morphology and microstructure of the ZnO aggregates, the novel procedures developed and disclosed herein also help ensure the formation of an aggregate film that has a high homogeneity of thickness, a high packing density, a high specific surface area, and good electrical contact between the film and the fluorine-doped tin oxide ("FTO") electrode and among the aggregate particles.

Lithium Zinc Oxide DSSC Device Fabrication

The novel method used for synthesizing the ZnO aggregates is a modified hydrolysis-condensation reaction in which a lithium salt is employed to mediate the growth of ZnO aggregates. For this fabrication process, 0.1 M of zinc acetate dihydrate (ZnAc.2H$_2$O) and 0.01 M of lithium salt (e.g., LiAc.2H$_2$O) were added to diethylene glycol (DEG) and the mixture was heated to 160° C. at a rate of 10V/min. In another embodiment, the heating rate used was in the range of 3 to 5° C./min. In another embodiment, the heating rate used was 4° C./min. According to various embodiments, varying the heating rate can be used to manage the size distribution of the ZnO aggregates. When a slower heating rate on the order of 3 to 5° C./min was used, it was observed that the ZnO film included a nearly monodisperse collection of aggregates. When a faster heating rate on the order of 10° C./min was used, it was observed that it was possible to create a polydisperse size distribution of aggregates. In one embodiment, the faster rate was used to generate a polydisperse size distribution of the ZnO aggregates with diameters ranging from 100 nm to 500 nm.

The reaction solution became transparent when the temperature reached 130° C. and gradually turned to a white, cloudy colloid at a temperature of 160° C. To allow the chemical reaction to be completed, the solution was kept at 160° C. for an extended period of time, ranging from approximately 2 hours to more than 8 hours. An extended aging time was determined to be necessary to ensure a sufficient hydrolysis of the ZnAc in the DEG. Sufficient hydrolysis is related to the crystallinity and crystal facet formation of the ZnO nanocrystallites. It is believed that good crystallinity facilitates the transport of electrons in the conduction band of ZnO as single crystals have fewer defects and electron traps and, therefore, higher electron mobilities. It is believed that properly formed crystal facets facilitate the absorption of a high density of dye molecules by providing suitable absorption surfaces.

The colloid was then concentrated by a sequential treatment of centrifugation (at 6000 rpm for 20 min), removal of the supernatant, and several redispersals of the precipitate in ethanol. The precipitate of ZnO aggregates was finally dispersed in ethanol with a concentration of 0.1 g/ml (approximately 0.5 g ZnO aggregate powder in 5 ml of ethanol) and then ultrasonicated for about 10 min until a colloidal suspension solution was obtained. It has been observed that use of either an improper solvent or an unsuitable concentration of ZnO aggregates resulted in poor film quality such as non-uniform film thickness, inadequate packing, and/or easy fracturing.

The photoelectrode films for aggregates synthesized with lithium, denoted as "Li—ZnO," were prepared through drop-casting the suspension solution of ZnO aggregates on fluorine-doped tin oxide (FTO) glass substrates. The film thickness was approximately 10 gm and was controlled by adjusting the amount of suspension solution placed on the glass substrate. Once the films were dry, they were annealed at a temperature in the range of 320 to 380° C. for 1 hour in air so as to remove any residual solvent and organic chemicals on the ZnO surface. For temperatures below 320° C., good electrical contact could not be formed and residual chemicals were not adequately removed. For temperatures above approximately 400° C., the primary ZnO nanocrystallites melted, forming larger sized particles. This increase in size corresponds to a decrease in internal surface area of the photoelectrode film that in turn leads to a reduced dye absorption density and hence a reduction in the solar cell conversion efficiency. In some embodiments, a temperature of 320, 330, 340, 350, 360, 370, or 380° C. was found to be useful.

For the purpose of comparison, films comprising ZnO aggregates synthesized with no lithium salt, denoted as "pure-ZnO," were also prepared with the same fabrication process. Both the "Li—ZnO" and "pure-ZnO" films were sensitized in Ru(dcbpy)$_2$(NCS)$_2$ (i.e., "N3") dye with a concentration of 5<10$^{-4}$ M in ethanol for 20-30 min. Solar cell performance was characterized by recording the photocurrent-voltage behavior while the photoelectrodes were irradiated by AM 1.5 simulated sunlight with a power density of 100 mW/cm$^2$. The electrolyte used contained 0.5 M tetrabutylammonium iodide, 0.1 M lithium iodide, 0.1 M iodine, and 0.5 M 4-ter-butylpyridine in acetonitrile. The film morphology and structure were characterized by scanning electron microscopy (SEM) and X-ray diffraction (XRD). Measurements of the zeta potential were carried out through the use of a zeta potential analyzer (ZetaPALS, available from Brookhaven Instruments Ltd., Chapel House, Stock Wood, Redditch, Worcestershire, B96 6ST, United Kingdom) operating under a current of 1.2 mA and an electric field of 14.3 V/cm.

It is contemplated that other deliberately added ionic materials may also modify the growth of and the final physical, chemical, and electrical properties of synthesized aggregates of materials such as ZnO.

Lithium Zinc Oxide DSSC Device Characterization

Figure 2:
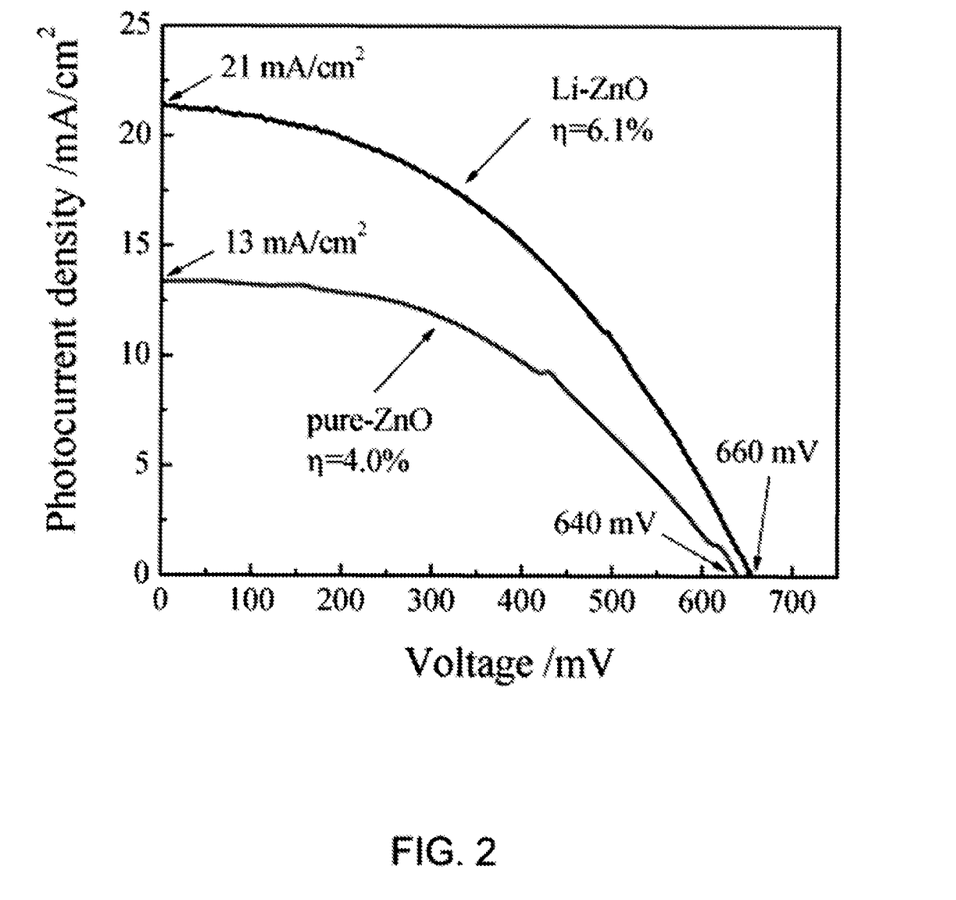
FIG. 2 is a graph that illustrates typical photovoltaic behavior for ZnO aggregate films synthesized in the absence of deliberately added lithium ions and aggregate films synthesized in the presence of deliberately added lithium ions, according to principles of the invention.

FIG. 2 is a graph that shows typical photovoltaic behavior of ZnO films comprising aggregates synthesized in the presence and absence of deliberately added lithium ions. The two film types display a similar open-circuit voltage ($V_{OC}$) in the range of 640-660 mV and fill factors (FF) of approximately 0.44-0.48. However, they differ in short-circuit photocurrent densities ($I_{SC}$), i.e., 13 mA/cm$^2$ for "pure-ZnO" and 21 mA/cm$^2$ for "Li—ZnO." The larger photocurrent density leads to a higher conversion efficiency of up to 6.1% for the "Li—ZnO" film. The maximum η for the "pure-ZnO" film was 4.0%. A ~53% enhancement in the conversion efficiency suggests that the use of lithium ions during the ZnO aggregate synthesis has a positive influence on the solar cell performance by affecting either the morphology, structure, and/or surface chemistry of the aggregates as well as the photoelectrode film. These aspects are discussed in more detail below.

Figure 3:
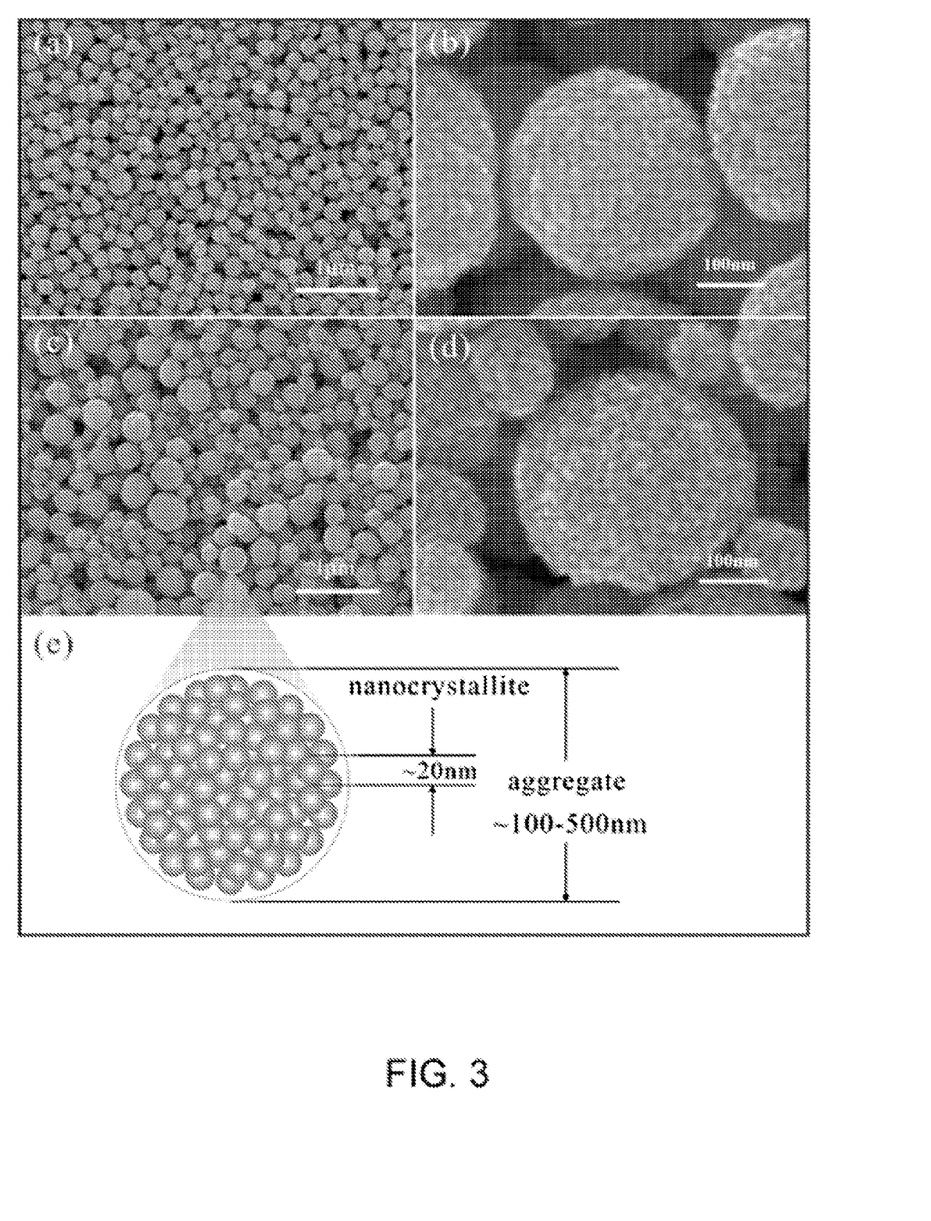
FIGS. 3(a), 3(b), 3(c), 3(d), and 3(e) are SEM images and a detail illustrative drawing of ZnO aggregate films synthesized in the absence of deliberately added lithium ions and aggregate films synthesized in the presence of lithium ions, according to principles of the invention.

FIG. 3 shows SEM images of ZnO aggregate films synthesized both in the presence and absence of deliberately added lithium ions. It can be seen that both films present a hierarchical structure of submicron-sized aggregates that themselves consist of nano-sized crystallites on the order of 20 nm.

Important differences between the films, however, are apparent from the SEM images. Under low magnification (FIGS. 3(a) and 3(c)), the "pure-ZnO" film is shown to be comprised of ZnO aggregates with a monodisperse size distribution (i.e., the majority of the aggregates have approximately the same diameter), whereas the "Li—ZnO" film is comprised of ZnO aggregates with a polydisperse size distribution (i.e., the aggregate diameters range from several tens to several hundreds of nanometers). In addition to the monodisperse versus polydisperse difference between the films, the "Li—ZnO" film can be seen to have a rougher aggregate surface under high magnification (FIGS. 3(b) and 3(d)).

Figure 4:
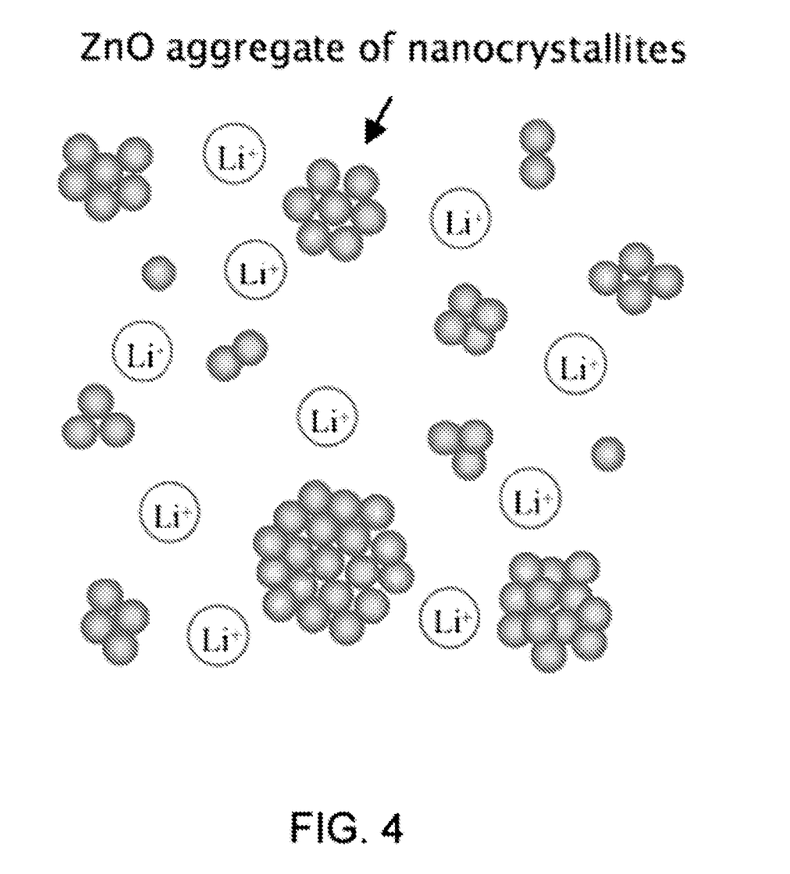
FIG. 4 is a diagram that shows an illustrative schematic of the growth of ZnO aggregates mediated by lithium ions, according to principles of the invention.

The polydisperse size distribution of ZnO aggregates synthesized in the presence of lithium salt reflects one of the important influences of lithium ions on the growth of ZnO aggregates. As shown in the schematic of FIG. 4, a possible mechanism leading to the polydisperse distribution is that lithium ions adsorbed on the ZnO surface may mediate the agglomeration of ZnO nanocrystallites.

By presenting a more random set of scattering centers, one advantage of the polydisperse size distribution of ZnO aggregates is that it is likely beneficial to effective light scattering. With more scattering events, the effective distance traveled by light within the photoelectrode film is significantly extended. A longer effective distance of travel increases the probability of photons interacting with the dye-sensitized material. This improves the light harvesting efficiency of the photoelectrode as well as the conversion efficiency of the solar cell. In an alternative interpretation that yields the same result, if each scattering event provides a defined probability that a photon will interact with a ZnO particle to generate an electron-hole pair, increasing the number of scattering events for a given photon should increase the total probability that the photon will generate an electron—hole pair. Under either interpretation, one would expect the conversion efficiency per photon to improve.

Figure 5:
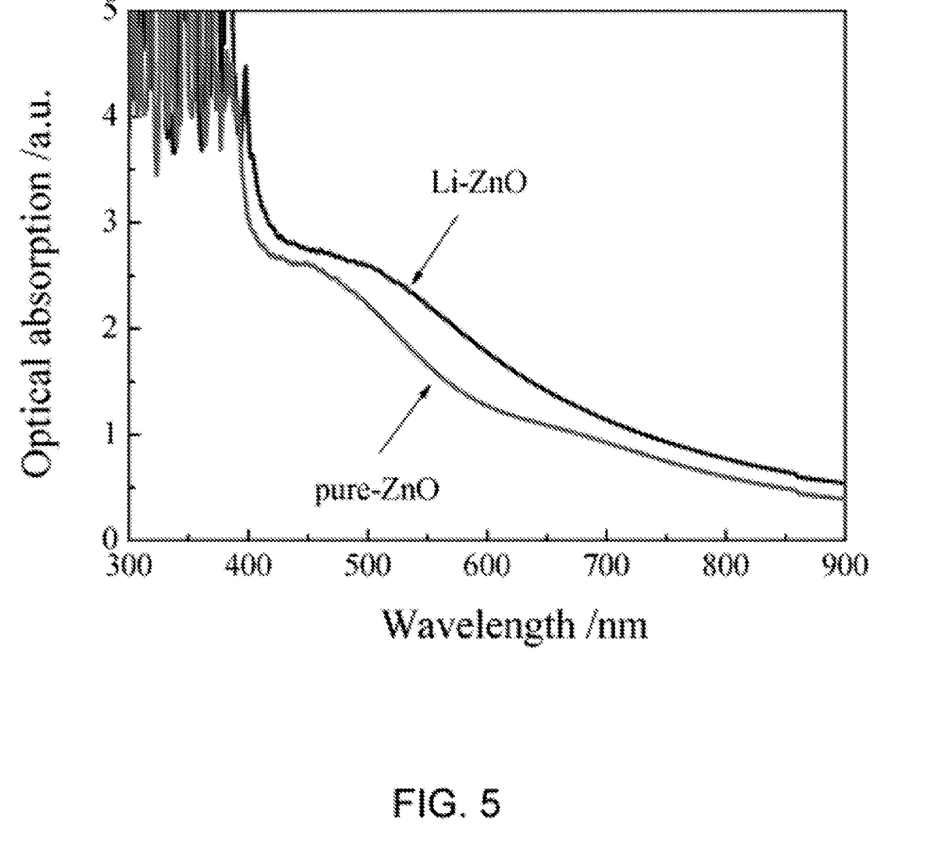
FIG. 5 is a graph that shows the difference in the optical absorption spectra of "pure-ZnO" films versus "Li—ZnO" films, according to principles of the invention.

The difference in light scattering between the "pure-ZnO" and the "Li—ZnO" films was investigated by comparing their optical absorption spectra, as shown in FIG. 5. Both of these films present similar absorption at wavelengths below 385 nm. These features correspond to the intrinsic absorption of the ZnO semiconductor with its energy band gap of 3.2 eV. Both films also display a pseudo-absorption band in the visible region that is caused by light scattering. However, in this region, the absorption band for the "Li—ZnO" film is more intense than for the "pure-ZnO" film. As described above, this is ascribed to the polydisperse distribution of ZnO aggregates in the "Li—ZnO" film being more efficient light scatters than the monodisperse distribution in the "pure-ZnO" film. The increase in the visible scattering also has a corresponding influence on the film's transparency.

The samples were also characterized through X-ray photoelectron spectroscopy (XPS). However, no detectable difference could be found between the XPS spectra for the "pure-ZnO" and "Li—ZnO" films, indicating that the two films have substantially the same chemical composition. As the lithium that had been present during the growth of the ZnO aggregates had now been removed, the absence of lithium in the XPS spectrum suggests that in the polydisperse films, lithium does not function as a dopant in or form a composite with the ZnO. It is important to note that we are using the identifier "Li—ZnO" only to distinguish the polydisperse aggregate films synthesized in the presence of lithium ions from the "pure-ZnO" monodisperse aggregate films synthesized without lithium. As stated above, the chemical composition of the ZnO in the two films is the same to the accuracy of the XPS spectra. XPS is a technique that allows one to examine the chemical composition near the surface of a material (typically to a depth of 1 to 10 nm). For experiments of relatively short duration, the detection limit is about 1000 parts per million, or about 0.1%. This suggests that the concentration of Li near the surface in the "Li—ZnO" material is relatively low, e.g., below the detection limit of XPS.

Figure 6:
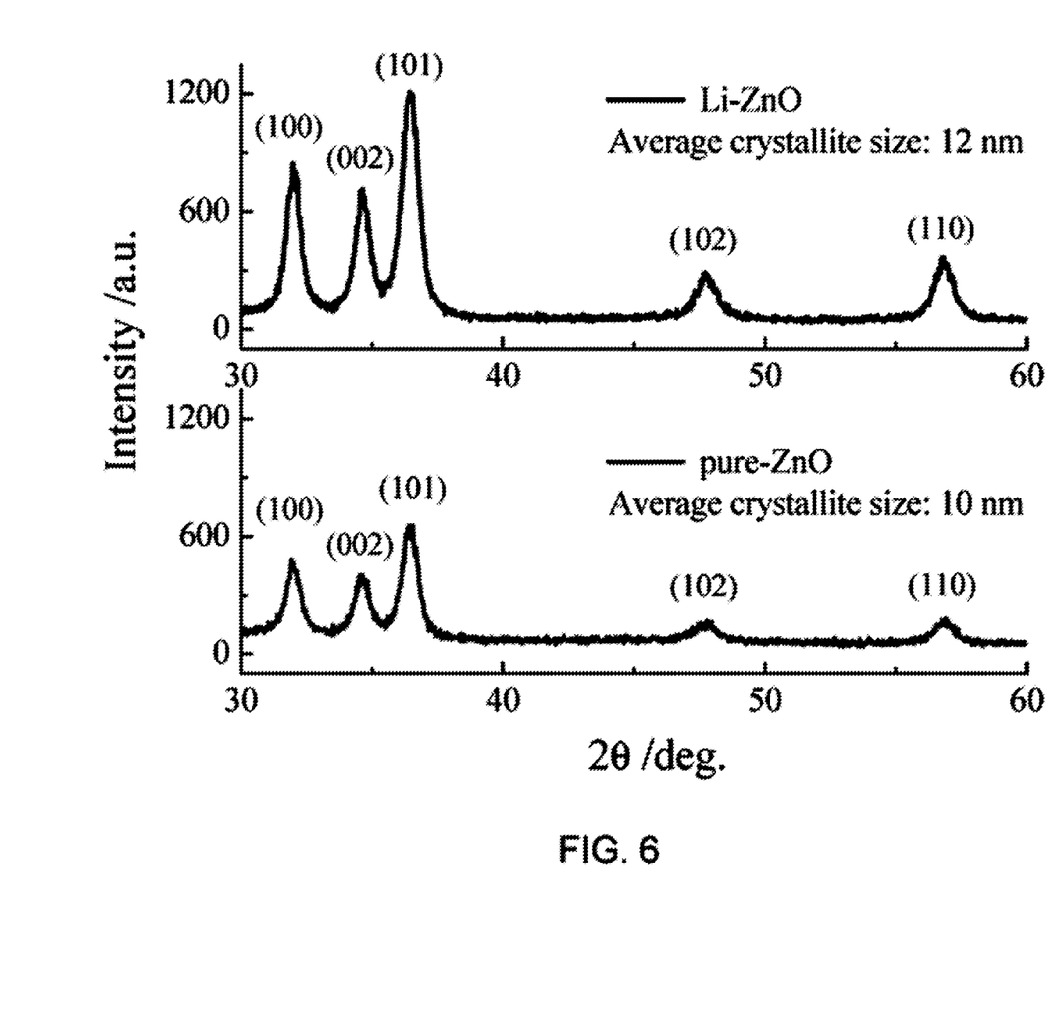
FIG. 6 is a graph that shows the difference in X-ray diffraction (XRD) patterns for "pure-ZnO" films versus "Li—ZnO" films, according to principles of the invention.

Differences in the surface roughness of the ZnO aggregates observed in the SEM images of FIGS. 3(b) and 3(d) were further characterized using X-ray diffraction (XRD) patterns. The XRD analysis indicates that the difference in surface roughness is associated with the average crystallite size, as shown in FIG. 6. Both films possess a Wurtzite ZnO phase. However, the peak intensity of the "Li—ZnO" is almost twice as strong as that of "pure-ZnO," revealing a difference in the crystallinity of the two films. Through the use of Scherrer's equation, it was estimated that the average crystallite size was 12 nm for "Li—ZnO" and 10 nm for "pure-ZnO." This suggests that, in addition to influencing the growth of ZnO aggregates, the lithium ions also play a role in promoting the nucleation and crystallization of ZnO nanocrystallites. One possible explanation is based on ZnO normally being an n-type semiconductor possessing native defects of oxygen vacancies and zinc interstitials. The interstitial zinc atoms are known to be detrimental to the growth of crystal grains. Lithium ions have a radius of 0.060 nm, smaller than that of 0.074 nm for $Zn^{2+}$. Therefore, the lithium ions may intercalate into the ZnO, enabling the interstitial zinc atoms to become highly diffusive. This would, in turn, cause an increase in the concentration of zinc atoms and, thus, promote the growth of crystalline ZnO grains. Relatively small amounts of an impurity of this type can have significant effects on the crystal growth behavior of the material.

There are at least several advantageous consequences of the lithium ion induced changes in the ZnO crystallinity, grain size, and film morphology. As mentioned above, better crystallinity reduces energy losses by improving the transport of electrons in the conduction band of the semiconductor. In addition, in a hierarchical film, the larger sized nanocrystallites are thought to result in a more porous structure with increased pore size. One advantage of this is that improved porosity is expected to improve the dye diffusion process within the film during sensitization. This, in turn, shortens the sensitization time and prevents the formation of a $Zn^{2+}$/dye complex. An additional advantage is that a porous structure with large pore size is believed to improve electrolyte diffusion under normal operating conditions in an aggregate film DSSC. The beneficial effects of improved porosity are thought to more than counterbalance the smaller specific area of the photoelectrode film that may, in theory, result from the increase in nanocrystallite grain size.

In addition to the influence of lithium ions on film morphology, crystallinity, microstructure, and porosity, it was also found that the surface chemistry of ZnO is very different for the "Li—ZnO" and "pure-ZnO" films. It is well known that ZnO is not stable when soaked in acidic dyes as the surface zinc atoms may be dissolved by protons released by the dye molecules. This can result in the formation of an inactive $Zn^{2+}$/dye complex layer on the ZnO surface that lowers the electron injection efficiency from the dye molecules to the ZnO semiconductor. For example, we reported in T. P. Chou, Q. F. Zhang, and G. Cao, "Effects of Dye Loading Conditions on the Energy Conversion Efficiency of ZnO and $TiO_2$ Dye-Sensitized Solar Cells," *Journal of Physical Chemistry C* 111(50):18804-18811, 2007, that the overall conversion efficiency of a ZnO aggregate film DSSC decreased gradually when the sensitization time in N3 dye became longer than 20 minutes.

Figure 7:
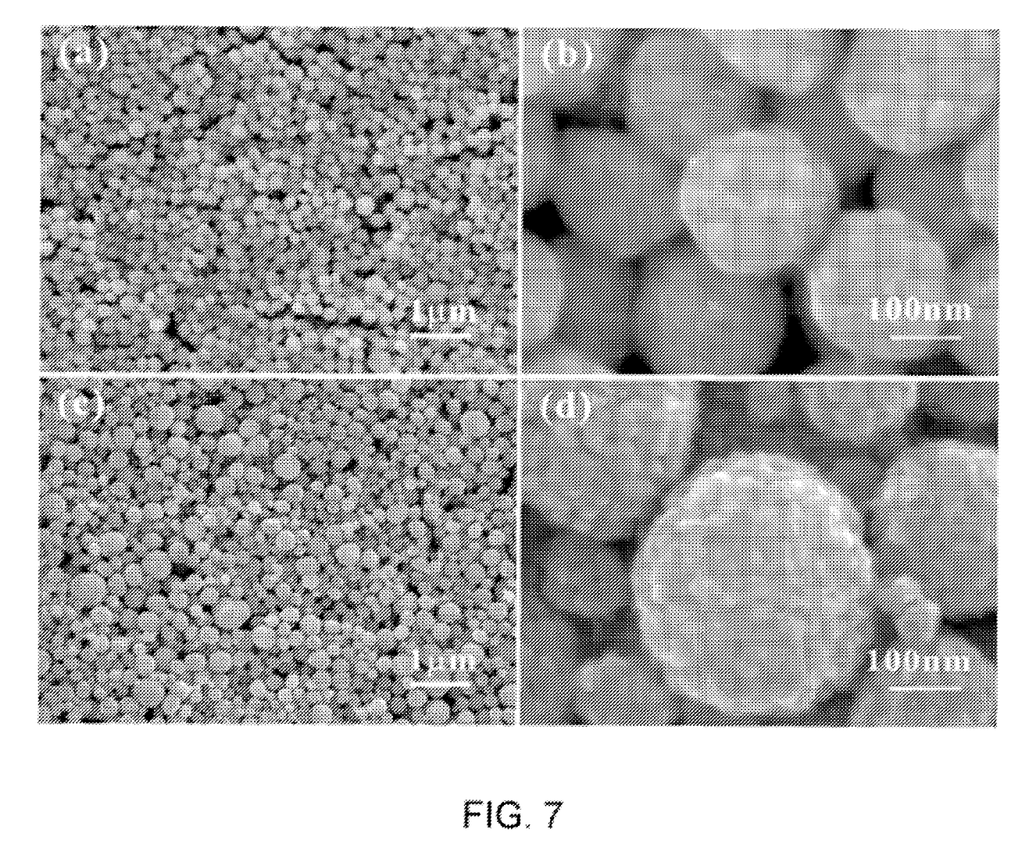
FIGS. 7(a), 7(b), 7(c), and 7(d) are SEM images showing differences between "pure-ZnO" and "Li—ZnO" films after dye sensitization, according to principles of the invention.

Here we show that the difference in surface chemistry results in an impressive improvement in the surface stability of ZnO in ruthenium-based dye solutions for the "Li—ZnO" films versus the "pure-ZnO" films. The study was performed by soaking the "pure-ZnO" and the "Li—ZnO" films in N3 dye for 2 hours. The sensitization time was designed to be at least 4-6 times longer than the conventional 20~30 minutes used for dye adsorption in ZnO films. After dye sensitization, the films were characterized by SEM. As shown in FIGS. 7(a) and 7(b), the "pure-ZnO" film suffered an over-adsorption, of dye so that the aggregates were covered with a thick layer of complex that significantly obscured the underlying nanocrystallite structure. Conversely as shown in FIGS. 7(c) and 7(d), the "Li—ZnO" film still displayed a relatively distinct nanocrystallite structure with only a slight accumulation of $Zn^{2+}$/dye complexes on the aggregate surfaces.

The difference in the dye adsorption between the "pure-ZnO" and "Li—ZnO" films is believed to be due to differences in their respective surface stabilities in ruthenium-based dyes. With an improved surface stability, the formation of the $Zn^{2+}$/dye complex is significantly suppressed in the "Li—ZnO" film. This prevents the aggregate pores from being blocked and allows the dye to filter into the interior of the ZnO aggregates. In addition to dye absorption, the open pores also provide pathways for electrolyte diffusion when the film is used in a DSSC. It is also believed that the improved surface stability favors monolayer dye adsorption on "Li—ZnO," resulting in more effective electron injection at the dye-semiconductor interface.

A possible explanation for the improved surface stability of ZnO in acidic dyes is related to the improved ZnO nanocrystallite growth mentioned above. By increasing the diffusivity of the interstitial zinc atoms, the lithium ions lead to a reduction in the concentration of zinc atoms at the nanocrystallite surface. This, in turn, leads to a ZnO complex with an oxygen-enriched surface that may hinder the reaction between the zinc atoms and protons released from the dye. With reactions between the zinc atoms and the protons hindered, the formation of the $Zn^{2+}$/dye complex is suppressed.

Figure 8:
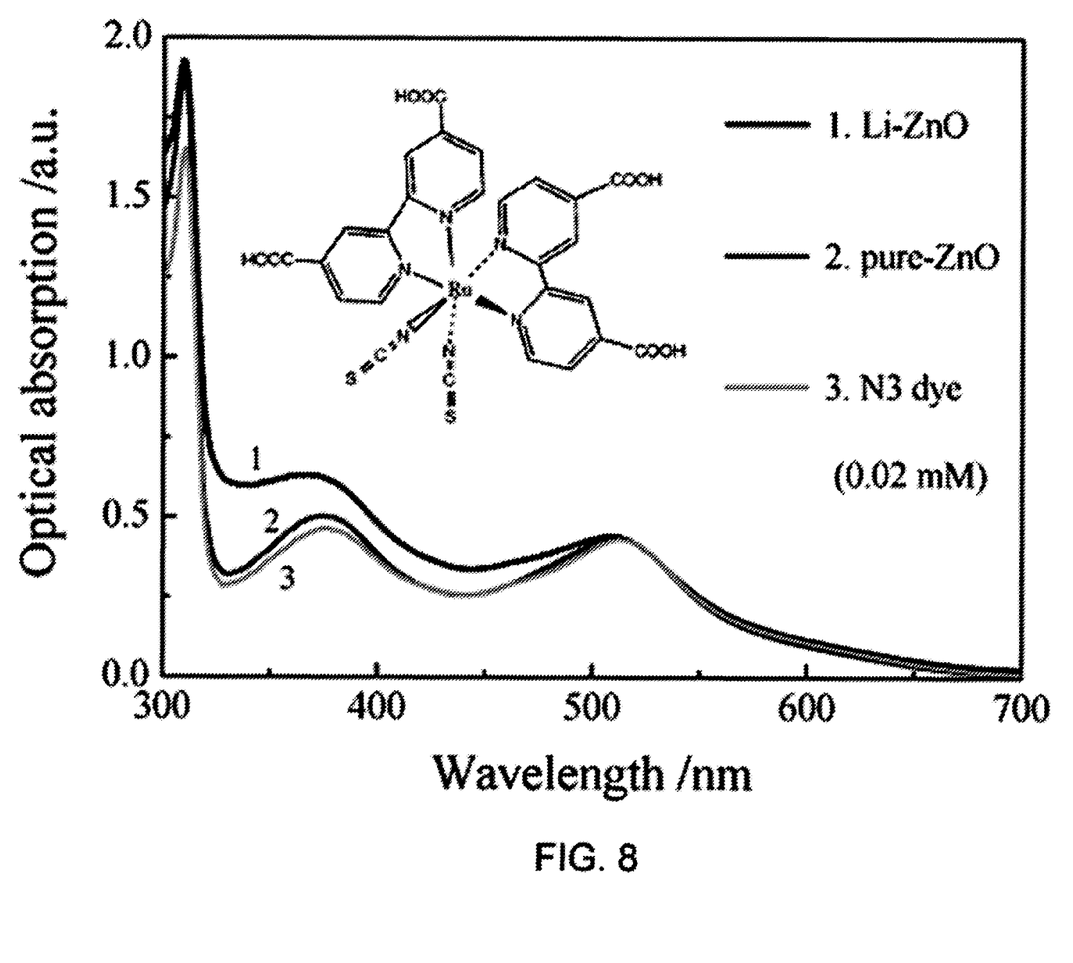
FIG. 8 is a graph that shows the results of a dye unloading experiment illustrating differences between "pure-ZnO" and "Li—ZnO" films, according to principles of the invention.

Differences in the dye adsorption between "pure-ZnO" and "Li—ZnO" films were further explored by a dye unloading experiment. In this experiment, the films were first sensitized in dye for 20 min and then soaked in a 1 M NaOH water-ethanol (1:1) solution for dye unloading. The dye absorption amount was estimated to be approximately $6.0 \times 10^{-8}$ mol/cm$^2$ for both films. As shown in FIG. 8, the solutions with the unloaded dye were then characterized by measuring their ultraviolet-visible (UV-Visible) absorption spectra. For comparison, the absorption spectrum for a solution of 0.02 mM N3 dye was also plotted. All three spectra showed the three absorption peaks, at wavelengths of 310, 375, and 510 nm, characteristic of N3 dye. The absorption spectra of the dye solution unloaded from the "pure-ZnO" film and from the virgin N3 were nearly identical both in terms of the peak positions and the relative intensity. However, the dye solution unloaded from the "Li—ZnO" film exhibited an absorption spectra that was increased in the near ultraviolet-visible region; that is, for wavelengths smaller than approximately 500 nm.

As discussed above, it is known that the optical absorption of dye molecules is caused by an electron transition from the highest occupied molecular orbital (HOMO) to the lowest unoccupied molecular orbital (LUMO). An N3 dye molecule structure possesses four carboxylic groups (COOH) at the end of the pyridyl rings and two NCS ligands connected to Ru(II). (See the molecular structure disclosed in FIG. 8.) The HOMO level is related to the ruthenium metal and NCS ligands, while the LUMO level is associated with the bipyridyl rings and carboxylic groups. In the case of a dye-sensitized oxide semiconductor, the carboxylic groups are spatially close to the semiconductor surface and form a bond with the semiconductor by donating a proton to the oxide lattice. There is no evidence suggesting changes in the molecular structure of N3 dye after it is unloaded from "Li—ZnO." Therefore, it is inferred that the enhanced absorbance present in the spectrum of the dye solution unloaded from the "Li—ZnO" film is due to a contribution from ZnO at ~385 nm. This is further supported by the observation that some ZnO segments appeared to peel off from the ZnO surface and dissolve in the dye solution when the dye was unloaded from the "Li—ZnO" samples. This phenomenon did not occur when the dye was unloaded from the "pure-ZnO" samples. This suggests that the chemical bond between the dye molecules and ZnO is greatly enhanced in the case of the "Li—ZnO" films.

A Zeta potential analysis was also carried out to better understand the change in the surface status of ZnO induced by the lithium ions. Suspension solutions were prepared by separately dispersing "pure-ZnO" and "Li—ZnO" aggregates in ethanol with a concentration of $1 \times 10^{-3}$ M. The results revealed an obvious difference in the zeta potentials for the two aggregates, for "pure-ZnO," the average was 642±2Mv; whereas for "Li—ZnO," the average was 41 mV. The zeta potential reflects the interaction between the solid surface and the liquid electrolyte. The ~34% decrease in zeta potential verifies the change in the surface chemistry of ZnO due to the use of lithium salt during the aggregate synthesis.

TABLE 1

| Sample | Dispersivity of aggregates | Average crystallite size (nm) | Zeta potential (mV) | Formation of $Zn^{2+}$/dye complex after sensitization | $V_{OC}$ (mV) | $I_{SC}$ (mA/cm$^2$) | FF | η* |
|---|---|---|---|---|---|---|---|---|
| "pure-ZnO" | Mono- | 10 | 64 ± 2 | yes | 640 | 13 | .048 | 4.0% |
| "Li—ZnO" | Poly- | 12 | 42 ± 1 | no | 660 | 21 | 0.44 | 6.1% |

Table 1 summarizes the differences between "pure-ZnO" and "Li—ZnO" films with regards to their morphology, structure, surface chemistry, and photovoltaic properties, where the overall conversion efficiency $\eta = (V_{OC} \times I_{SC} \times FF)/P_{in}$, $V_{OC}$ is the open-circuit voltage, $I_{SC}$ is the short-circuit current, FF is the fill factor, and $P_{in}$ is the incident power density (=100 mW/cm$^2$). It can be seen from the discussion above and the results summarized in Table 1 that lithium ions exert a significant influence on the growth of ZnO aggregates and result in an improvement in the performance of DSSCs fabricated with them.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

The embodiments of the invention in which an exclusive property or privilege is claimed are defined as follows:

1. A dye-sensitized solar cell, comprising:
    a cathode having a conductive surface;
    an anode having a film of zinc oxide aggregate particles, said zinc oxide aggregate particles having been synthesized in the presence of deliberately added lithium ions, said zinc oxide aggregate particles further having been sensitized in a dye, said dye capable of absorbing photons and transferring photoexcited electrical charge to said zinc oxide aggregate particles, wherein the zinc oxide aggregate particles each comprise a plurality of crystalline zinc oxide nanoparticles; and
    an electrolyte disposed between said cathode and said anode, said electrolyte providing an electrical pathway between said cathode and said anode.

2. The dye-sensitized solar cell of claim 1, wherein said zinc oxide aggregate particles have a plurality of sizes.

3. The dye-sensitized solar cell of claim 1, wherein a crystallinity of said zinc oxide aggregate particles is improved relative to zinc oxide aggregate particles synthesized in the absence of deliberately added lithium ions.

4. The dye-sensitized solar cell of claim 1, wherein a porosity of said zinc oxide aggregate particles is improved relative to zinc oxide aggregate particles synthesized in the absence of deliberately added lithium ions.

5. The dye-sensitized solar cell of claim 1, wherein absorption of said dye by said zinc oxide aggregate particles is improved relative to zinc oxide aggregate particles synthesized in the absence of deliberately added lithium ions.

6. The dye-sensitized solar cell of claim 1, wherein formation of a complex between said dye and zinc ions in said zinc oxide aggregate particles is suppressed relative to zinc oxide aggregate particles synthesized in the absence of deliberately added lithium ions.

7. The dye-sensitized solar cell of claim 1, wherein a light harvesting efficiency of the dye-sensitized solar cell is improved relative to zinc oxide aggregate particles synthesized in the absence of deliberately added lithium ions.

8. The dye-sensitized solar cell of claim 1, wherein electrical conduction in said zinc oxide aggregate particles is improved relative to zinc oxide aggregate particles synthesized in the absence of deliberately added lithium ions.

9. The dye-sensitized solar cell of claim 1, wherein the zinc oxide aggregate particles contain no lithium.

10. The dye-sensitized solar cell of claim 1, wherein the zinc oxide aggregate particles are each spherical and have a diameter of 500 nm or less.

11. The dye-sensitized solar cell of claim 1, wherein the crystalline zinc oxide nanoparticles each have a diameter of 20 nm or less.

* * * * *